UNITED STATES PATENT OFFICE.

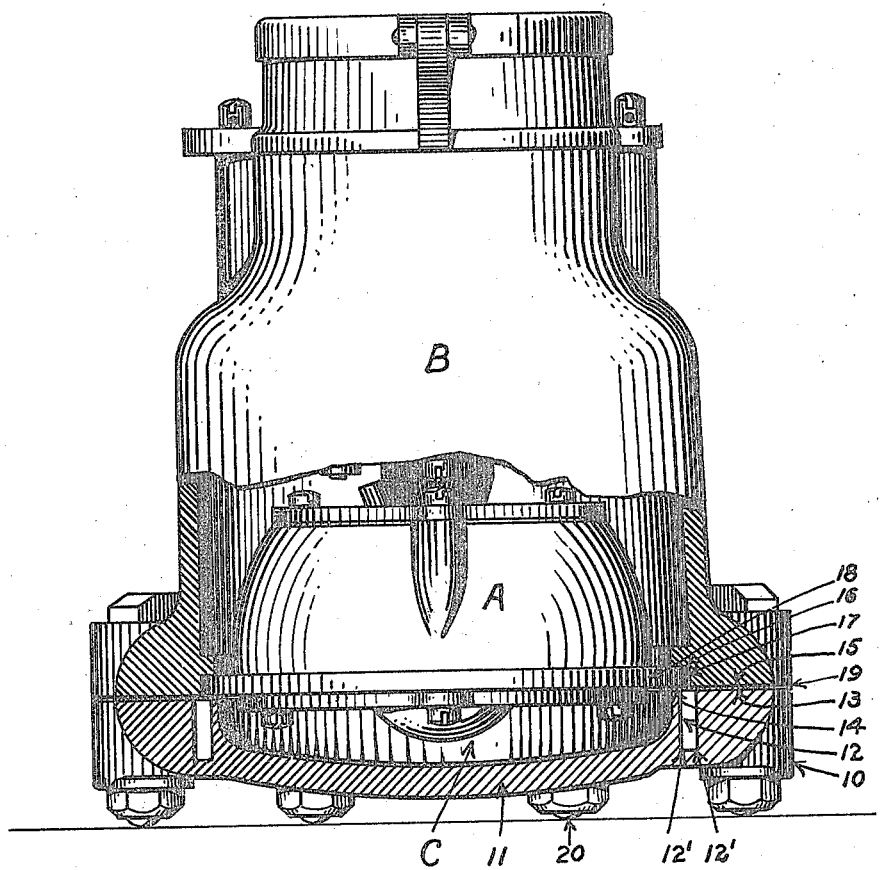

JAMES A. TILDEN, OF BOSTON, MASSACHUSETTS.

METER-CASING.

1,187,679.

Specification of Letters Patent.  Patented June 20, 1916.

Application filed January 4, 1916. Serial No. 70,290.

*To all whom it may concern:*

Be it known that I, JAMES A. TILDEN, a citizen of the United States, residing at Boston, in the county of Suffolk and State of Massachusetts, have invented a new and useful Meter-Casing, of which the following is a specification.

This invention concerns water-meters of what is known as the frost-proof type, in which a portion of the meter-casing, usually the bottom-plate, is provided with a breakable section, which, yielding under expansion of water frozen within the casing, is forced out and relieves the pressure before the meter mechanism or main portion of the casing is injured. In such meters as heretofore constructed the arrangement of the meeting surfaces between the main portion of the casing and bottom-plate has been such that the strain upon the parts necessary to insure a water-tight joint frequently breaks the separable portion either when assembling the casing or during the use of the apparatus. These meters also have the separable portion formed in casting by a reduction in the thickness of certain elements, as the bolt-lugs which secure the sections of the casing together. On account of the natural irregularities of cast metal it is impossible to depend on a definite line of fracture, projections often being left which interfere with the movement of the meter mechanism under pressure and result in injury. By my invention the strains are so equalized that there is no danger of breakage from this source; when freezing occurs the fracture is along a definite line; and the joints may be accurately made with less labor than heretofore. Moreover, the meter mechanism is so mounted in the casing that upon the displacement of the breakable portion said mechanism is left entirely free to move outwardly and will thus be protected from injury.

The accompanying drawing illustrates in side elevation a meter embodying the invention, the lower portion of the casing being broken away.

The meter mechanism A is inclosed in a casing consisting of an upper or main portion B and a bottom portion or plate C. This plate C is relatively thick at its margin 10, while its center 11 may be comparatively thin. In the inner surface of the margin 10 is a deep groove 12 concentric with the axis of the casing, situated close to the central portion 11 and extending into proximity with the outer surface of the plate. The groove 12 is angular in transverse section, having at its bottom the corners 12', 12', and is cut uniformly in the metal by means of a lathe or other machine-tool. This gives a complete circular line at which fracture by pressure within, as the freezing of contained water, may readily occur. The break is invariably at one of the corners 12', and, because of the perfect uniformity of the machined groove, it is clean, leaving no inward projections. The inner surfaces 13, 14 of the margin 10 at both sides of the groove lie in a single plane, and may be therefore quickly and accurately formed by putting the plate in a lathe and facing it off by a single operation. Against the surface 13 a surface 15 of the portion B abuts, it extending from a line opposite the exterior of the margin 10 to one about midway of the groove 12. It may be trued up similarly to the surface 13. Inside this surface 13 is a circular recess 16, rectangular in section and extending over the surface 14 of the margin 10. Seated in the recess and turned to the same thickness as a vertical wall 17 thereof is a flange 18 of the meter mechanism A. The outer periphery of the flange occupies a position within the outer edge of the groove 12, it being approximately opposite the center thereof. Between the surfaces 13 and 14 of the portion C on the one hand, and the surface 15 on the portion B and the under surface of the flange 18 on the other, is inserted a single packing ring or gasket 19 of any suitable material, as heavy paper, and the portions B and C drawn together by bolts 20 to form a water-tight joint. On account of the accuracy with which the meeting faces may be made when arranged in accordance with my invention the assembling pressure applied by bolts 20 is uniform over the entire width of the gasket, and the integrity of the joint assured without excess of pressure upon the surface 14 of the separable center 11. When as a result of the formation of ice within the casing the center portion 11 of the bottom plate separates from the margin by breaking along a line 12', the displacement of the surface 14 from opposite the flange 18 removes the support of the meter mechanism, leaving it free to move to a position where it will be relieved from the effect of the ice. The relation of the periphery of the flange to the width of the groove 12 gives ample clearance for this purpose. Even were points of metal left at 12' in the path of the meter mechanism upon separation, no injury to it would result, as the depth of the groove alone is sufficient to provide the necessary relief from pressure.

I claim:

1. A meter-casing comprising a main portion and a bottom portion coöperating therewith and provided with an internal annular groove furnishing a central readily breakable section and meter mechanism supported in the casing and extending at its periphery over only a portion of the width of the groove.

2. A meter casing comprising a main portion and a bottom portion coöperating therewith and provided with an internal annular groove having a plurality of angular portions and furnishing a readily breakable section, and meter mechanism supported in the casing and extending over one only of the angular portions of the groove.

3. A meter-casing comprising a main portion and a bottom portion coöperating therewith and provided with an annular groove furnishing a central readily breakable section, the inner surface of the bottom portion at each side of the groove lying in the same plane.

4. A meter-casing comprising a main portion and a bottom portion coöperating therewith and provided with an internal groove furnishing a central readily breakable section, and meter mechanism situated in the casing with its periphery opposite the groove.

5. A meter-casing comprising a portion provided with a continuous groove furnishing a readily breakable section, and meter mechanism supported in the casing with its periphery within the outer edge of the groove.

6. A meter-casing comprising a main portion and a bottom portion coöperating therewith and provided with an annular groove furnishing a central readily breakable section, and meter mechanism supported upon the bottom portion with its periphery within the outer edge of the groove.

7. A meter-casing comprising a portion provided with a continuous groove furnishing a readily breakable section, and meter mechanism supported in the casing with its periphery within the outer edge of the groove, said groove being of sufficient depth to permit the meter mechanism to move into it from the normal position and relieve pressure upon said mechanism.

8. A meter-casing comprising a main portion and a bottom portion coöperating therewith and provided with an annular groove furnishing a central readily breakable section, meter mechanism supported upon the bottom portion with its periphery within the outer edge of the groove, a gasket extending between the main portion of the casing and the meter mechanism on the one hand and the bottom portion on the other, and means for compressing the gasket between these elements.

9. A meter-casing comprising a main portion and a bottom portion provided with an annular groove furnishing a central readily breakable section, the inner surface of the bottom portion at each side of the groove lying in the same plane, a gasket interposed between said surface and the main portion, and means for compressing the gasket between the portions.

10. A meter-casing comprising a main portion and a bottom portion provided with an annular groove furnishing a central readily breakable section, the inner surface of the bottom portion at each side of the groove lying in the same plane, a continuous gasket coöperating with said surface at both sides of the groove, meter mechanism extending between the main casing and gasket at the inner side of the groove, and means for compressing the gasket between the casing portions and between the bottom portion and the meter mechanism.

11. A meter-casing comprising a main portion and a bottom portion provided with an annular groove furnishing a central readily breakable section, the inner surface of the bottom portion at each side of the groove lying in the same plane, a continuous gasket coöperating with said surface at both sides of the groove, meter mechanism extending between the main casing and gasket at the inner side of the groove, the surface thereof contacting with the gasket being located in the same plane as the gasket-engaging surface of the main portion, and means for compressing the gasket between the casing portions and between the bottom portion and the meter mechanism.

Signed at Boston, in the county of Suffolk and State of Massachusetts, this 29th day of December, 1915.

JAMES A. TILDEN.